Jan. 15, 1929.

L. BALOGH 1,699,271

AUTOMOBILE SAFETY DEVICE

Filed June 29, 1927    2 Sheets-Sheet 1

INVENTOR
Louis Balogh
BY
ATTORNEY

Jan. 15, 1929.　　　　　　　　　　　　　　　　　　1,699,271
L. BALOGH
AUTOMOBILE SAFETY DEVICE
Filed June 29, 1927　　　　2 Sheets-Sheet 2

INVENTOR
Louis Balogh
BY
ATTORNEY

Patented Jan. 15, 1929.

1,699,271

UNITED STATES PATENT OFFICE.

LOUIS BALOGH, OF FORT ERIE, ONTARIO, CANADA.

AUTOMOBILE SAFETY DEVICE.

Application filed June 29, 1927. Serial No. 202,195.

This invention relates to a new and useful device in the nature of a safety attachment for motor vehicles embodying a means of stopping the motor vehicle in combination with a means of preventing the person struck by the said motor vehicle from being run over.

The object of the invention is to provide a safety attachment for motor vehicles of novel construction and arrangement of parts hereinafter more fully described, claimed and illustrated in the accompanying drawing.

Figure 1:
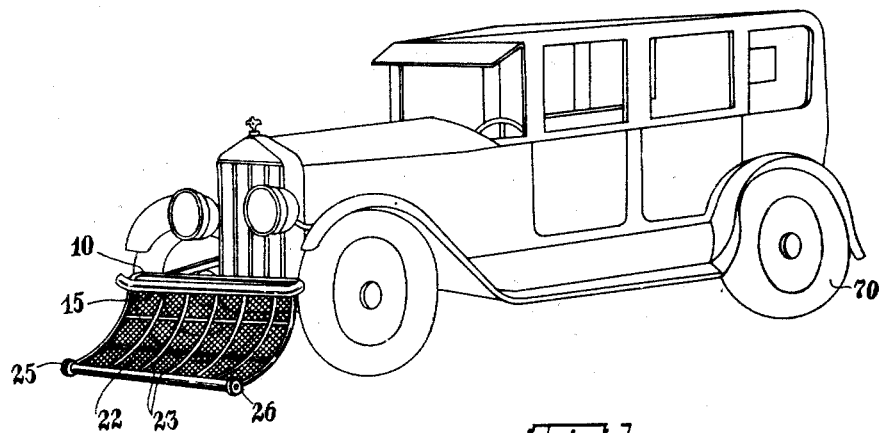
Fig. 1 is a perspective view of a motor vehicle equipped with my improved safety attachment.
Figure 2:
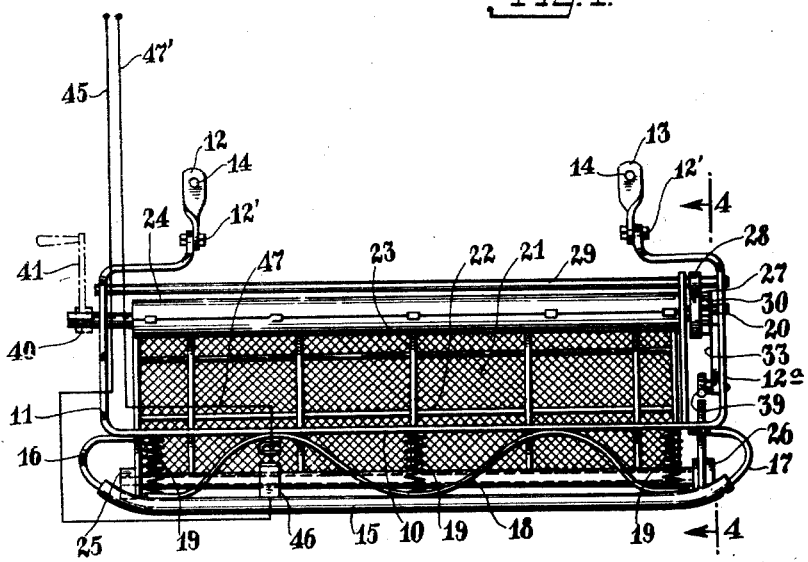
Fig. 2 is an enlarged top plan detail view of the fender and extension member as embodied in my improved device.

As here embodied my improved device comprises a supporting member 10, provided with side extended elements 11 and 12, hinged as at 12', by bolts, screws, or the like, to the brackets 12ª and 13. The brackets 12ª and 13 have apertures 14 formed therein, adapted to receive bolts, studs, or the like, as a means for securing the same to the forward extremities of the chassis frame of a motor vehicle. The fender 15, preferably of metal covered with rubber, is adapted to extend the entire width of the supporting member 10, and is provided with extended elements 16 and 17, as a means of attaching the fender 15, to the supporting member 10, so as to hold the fender 15, in front of the said supporting member. The flexible member 18 is positioned intermediate the fender 15 and the supporting member 10, and is formed or bent so as to make contact intermediately thereof with adjacent portions of the fender 15 and the supporting member 10. The expansion springs 19 are positioned intermediate the fender 15 and the supporting member 10, and are attached thereto, so as to normally hold the fender 15 in an extended position.

The rod 20 is rotatively mounted in the extended elements 11 and 12 of the supporting member 10. The flexible member 21, or extension member has attached thereto transverse and longitudinal brace members 22 and 23, so as to provide stability to the said flexible member. The flexible member 21 is attached to the drum 24 mounted on the rod 20, and is adapted to be wound on the said drum. The rollers 25 and 26 are rotatively attached to the free extremities of the flexible member 21. The coil spring 27 is attached to the rod 20 and is wound thereon, and is attached, as at 28, to the cross rod 29 secured to the extended elements 11 and 12, of the supporting member 10. The ratchet wheel 30 is secured to the rod 20. The ratchet pawl 21 is pivotally attached, as at 32, to the element 12, intermediately thereof, and is adapted to engage the teeth of the ratchet wheel 30. The rod 33 is pivotally attached as at 34 and at 35, to the free extremities of the ratchet pawl 31, and the lever 36. The lever 36 is pivotally attached intermediately thereof, as at 37, to the extended portion 12 of the supporting member 10. The rod 38 is slidably mounted in the supporting member, and is adapted to extend between the fender 15 and adjustable end 39 of the lever 37. The lever 36 has a horizontal portion 36' formed on its upper edge with a dovetailed groove 36ª and a plurality of threaded apertures 36ᵇ. The adjustable end 39 is slidably engaged in the dovetailed groove 36ª and has a locking pin 39' engageable in the apertures 36ᵇ. The length of stroke of rod 38 necessary to move lever 36 may therefore be varied. The rod 20 is provided with an extended portion 40, of square cross section, adapted to removably receive the crank member 41, as a means of rotating the drum 24, so as to wind the extended member 21 thereon, and as a means of winding the spring 27 which is held in a wound position by the ratchet pawl 31.

Figure 3:
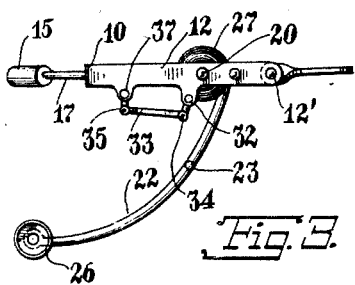
Fig. 3 is a side elevational view thereof.
Figure 4:
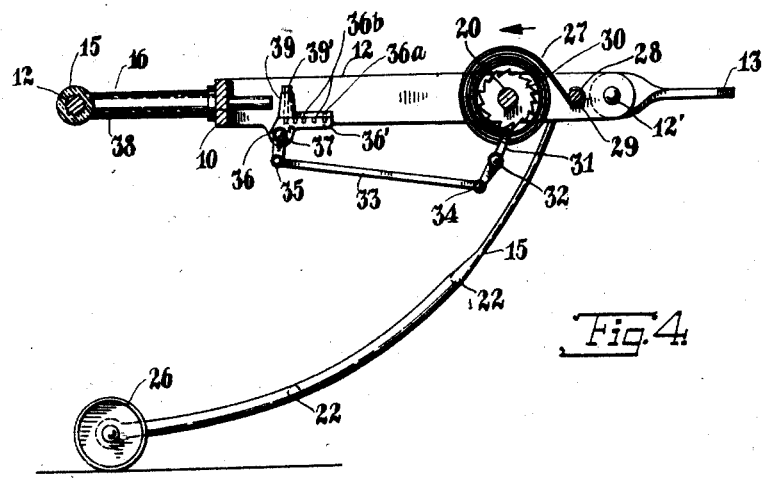
Fig. 4 is a transverse sectional view taken on the line 4—4 of Fig. 3.
Figure 5:
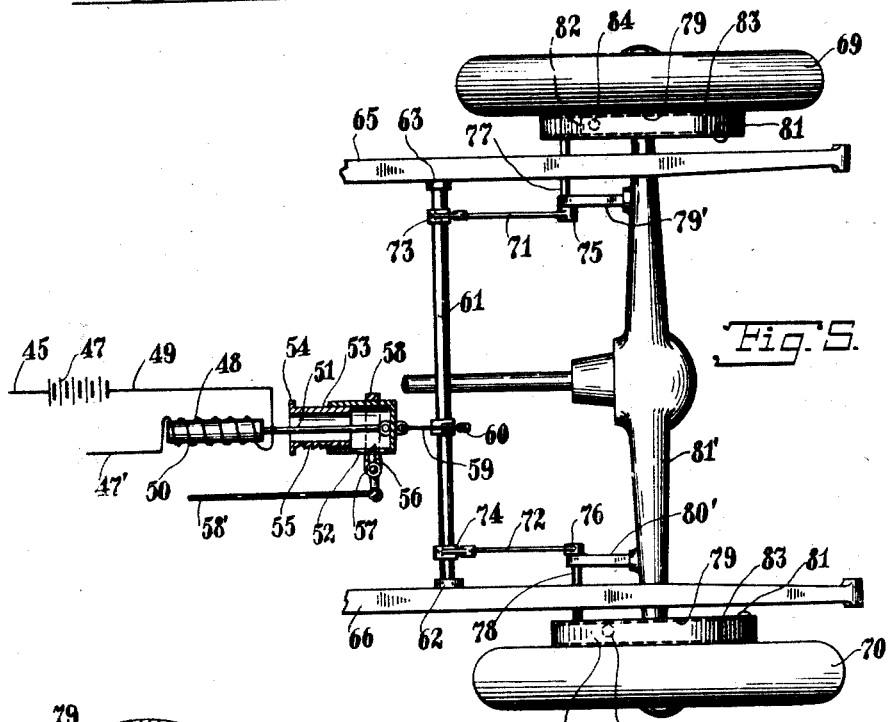
Fig. 5 is a fragmentary plan view of a motor vehicle chassis equipped with the brake actuating mechanism as embodied in my improved device.
Figure 6:
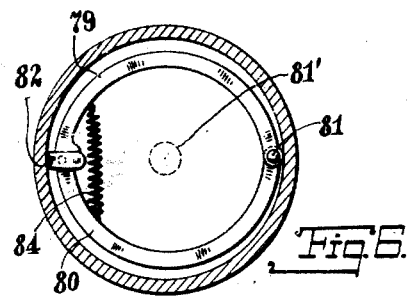
Fig. 6 is a side elevational detail view of the brakes as embodied in my improved device.

The above described construction is such as will permit the spring 27 to be released, in event the fender 15 is forced backwards, as would be apparent if a person were struck by the motor vehicle equipped with my improved device, as a means of extending the extension member 21, so as to prevent the said person from being run over by the said motor vehicle. It should be understood that the longitudinal brace member 23 is formed or bent somewhat curved, so as to permit the extension member 21 to assume the position or form, as clearly shown in Fig. 3, the rollers 25 and 26, striking the ground.

The wire 45 is connected to the block 46 and to the battery 47. A similar wire 47' is connected to the supporting member 10, and to the solenoid winding 48. A similar wire 49 is connected to the battery 47 and to the solenoid winding 48. The latter described construction is such as will permit the block 46 when the fender 15 is forced backwards against the supporting member 10, to complete an electric current, so as to energize the solenoid winding 48, so as to force the movable core 50 of the solenoid forwards. The rod 51 is attached to the core 50, and to the tubular member 52 adapted to slidably engage over the tubular member 53 provided with a flanged element 54, as a means of attaching same to any convenient part of a motor vehicle chassis. The tubular member 53, has formed or cut on its periphery ratchet teeth 55, adapted to be engaged by the ratchet pawl 56 pivotally attached as at 57 to the strap member 58 secured to the tubular member 52. The flexible member 58', a wire cable or the like, is secured to the free extremity of the ratchet pawl 56, and is extended therefrom, within easy reach of the operator of the said motor vehicle. The rod 59 is attached to the tubular member 52, and to the brake lever 60 secured to the brake shaft 61 rotatively mounted in the brackets 62 and 63, secured to the side rails 65 and 66 respectively, of the chassis of the said motor vehicle. The brake shaft 61 is operatively attached to the brake shoes 79 and 80 mounted on the rear wheels 69 and 70 respectively by the conventional rods 71 and 72, attached to the levers 73, 75, and 74 and 76 respectively. The levers 75 and 76, are secured to the brake shafts 77 and 78, respectively rotatively mounted in the brackets 79 and 80 secured to the rear axle housing 81. The cams 82 are attached to the brake shafts 77 and 78.

The brake shoes 79 and 80, are pivotally attached as at 81, and are normally held in contact with the cams 82, and in disengagement with the brake drums 83, by means of the tension springs 84 attached to the said brake shoes 79 and 80.

The above described construction is such as will permit the said solenoid when energized, as above set forth to apply the brakes shoes 79 and 80, for the purpose of stopping the said motor vehicle simultaneously with the extending of the extension member 22. It should be understood that the ratchet pawl 56 will hold the said brakes in a locked or engaged position until the flexible member 58 is pulled, the said brakes being then released by the usual tension springs provided for this purpose.

Having thus described my invention, what I claim as new and desire to protect by Letters Patent of the United States is as follows:

1. In a safety attachment of the class described a fender adapted to engage a supporting member as a means of releasing a spring so as to extend an extension member normally held in a wound position on a drum.

2. In a safety attachment of the class described a fender adapted to engage a supporting member as a means of releasing a spring so as to extend an extension member normally held in a wound position on a drum, in combination with a means of opening a solenoid as a means of applying the brakes of the said motor vehicle, a means of releasing the said brakes.

3. In a safety attachment of the class described a coil spring adapted to normally hold an extension member in wound position on a drum, as a means of releasing the said extension member when a fender attached to a supporting member is engaged with the said supporting member.

In testimony whereof I have affixed my signature.

LOUIS BALOGH.